(12) United States Patent
Billman

(10) Patent No.: US 12,550,813 B1
(45) Date of Patent: Feb. 17, 2026

(54) SYSTEMS AND METHODS FOR SPRINKLER HEAD DETECTION

(71) Applicant: United Services Automobile Association (USAA), San Antonio, TX (US)

(72) Inventor: Bradly Jay Billman, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 723 days.

(21) Appl. No.: 17/874,923

(22) Filed: Jul. 27, 2022

Related U.S. Application Data

(60) Provisional application No. 63/227,569, filed on Jul. 30, 2021.

(51) Int. Cl.
| | |
|---|---|
| *A01D 34/00* | (2006.01) |
| *G05D 1/00* | (2006.01) |
| *G06K 19/07* | (2006.01) |
| *G06Q 30/0207* | (2023.01) |
| *G06Q 40/08* | (2012.01) |
| *H04W 4/02* | (2018.01) |
| *H04W 4/40* | (2018.01) |
| *A01D 101/00* | (2006.01) |

(52) U.S. Cl.
CPC ......... *A01D 34/006* (2013.01); *G05D 1/0044* (2013.01); *G06K 19/0723* (2013.01); *G06Q 30/0207* (2013.01); *G06Q 40/08* (2013.01); *H04W 4/023* (2013.01); *H04W 4/40* (2018.02); *A01D 2101/00* (2013.01)

(58) Field of Classification Search
CPC ............. A01D 34/006; A01D 2101/00; G05D 1/0044; G06K 19/0723; G06Q 30/0207; G06Q 40/08; H04W 4/023; H04W 4/40
See application file for complete search history.

(56) References Cited

U.S. PATENT DOCUMENTS

| | | | | |
|---|---|---|---|---|
| 4,848,661 | A * | 7/1989 | Palmer | 239/204 |
| 2011/0166705 | A1 * | 7/2011 | Anderson | 700/253 |
| 2018/0213731 | A1 * | 8/2018 | Wykman | A01G 20/30 |
| 2019/0035071 | A1 * | 1/2019 | Klein | G06T 7/0004 |
| 2021/0260615 | A1 * | 8/2021 | Tinguely | B05B 15/16 |
| 2022/0248589 | A1 * | 8/2022 | Davern | A01B 45/023 |
| 2023/0236604 | A1 * | 7/2023 | Frick | G05D 1/0257 |

FOREIGN PATENT DOCUMENTS

| | | | | |
|---|---|---|---|---|
| JP | H08256522 A | * | 10/1996 | A01B 69/00 |

* cited by examiner

*Primary Examiner* — Ramya P Burgess
*Assistant Examiner* — Brittany Renee Peko
(74) *Attorney, Agent, or Firm* — Fletcher Yoder, P.C.

(57) ABSTRACT

The present disclosure is directed to systems and methods for detecting sprinkler heads. A lawn mower may utilize one or more processors to detect that an RFID tag signal associated with a sprinkler head. The one or more processors may determine a position of the lawn mower relative to the sprinkler head. The one or more processors may also control the lawn mower in response to the position of the lawn mower being within a threshold distance of the sprinkler head.

20 Claims, 3 Drawing Sheets

SYSTEMS AND METHODS FOR SPRINKLER HEAD DETECTION

CROSS-REFERENCE TO RELATED APPLICATION

This application claims priority to and the benefit of U.S. Provisional Application No. 63/227,569, entitled "SYSTEMS AND METHODS FOR SPRINKLER HEAD DETECTION," filed Jul. 30, 2021, which is hereby incorporated by reference in its entirety for all purposes.

BACKGROUND

The present disclosure relates generally to systems and methods for sprinkler head detection during lawn mowing.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Lawn maintenance, including lawn mowing, at a property is generally performed by a property owner and/or a lawn maintenance employee on a routine basis. The property owner and/or the lawn maintenance employee may inadvertently drive a lawn mower into contact with sprinkler heads that are part of a sprinkler system. This may occur because the property owner and/or the lawn maintenance employee may not know respective locations of all of the sprinkler heads on the property. The contact between the lawn mower and the sprinkler heads may damage the sprinkler heads. Furthermore, the property owner and/or the lawn maintenance employee may not become aware of the damage to the sprinkler heads until a later date, which can lead to increased water bills and/or water damage in an area surrounding the sprinkler heads. However, it is now recognized that various advantages may be gained by providing a detection system for sprinkler heads.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes one or more processors and a memory storing instructions executable by the one or more processors to cause the one or more processors to receive a radio frequency identification (RFID) tag signal emitted by a RFID tag associated with a sprinkler head and determine a distance between a lawn mower and the sprinkler head based on the RFID tag signal. Additionally, the memory storing instructions are executable by the one or more processors to cause the one or more processors to control the lawn mower in response to the distance between the lawn mower and the sprinkler head being within a threshold distance.

In a further embodiment, a system includes one or more processors and a memory storing instructions executable by the one or more processors to cause the one or more processors to receive a wireless signal output by a communication component of a sprinkler head at a first time and determine a distance between a lawn mower and the sprinkler head based on the wireless signal. Additionally, the memory storing instructions executable by the one or more processors cause the one or more processors to control the lawn mower in response to the distance between the lawn mower and the sprinkler head being within a threshold distance.

In an additional embodiment, a method includes detecting, via communication circuitry, a wireless signal output by a communication component of a sprinkler head; determining, via one or more processors, a position of the communication component within an area based on the wireless signal; accessing, via the one or more processors, a baseline position of the communication component within the area; and comparing, via the one or more processors, the position of the communication component of the sprinkler head within the area to the baseline position of the communication component within the area. Additionally, the method includes determining, via the one or more processors, that the position of the communication component of the sprinkler head within the area is different than the baseline position of the communication component within the area; and sending, via the communication circuitry, a notification to an electronic device associated with a user of the sprinkler head in response to determining that the position of the communication component of the sprinkler head within the area is different than the baseline position of the communication component within the area.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
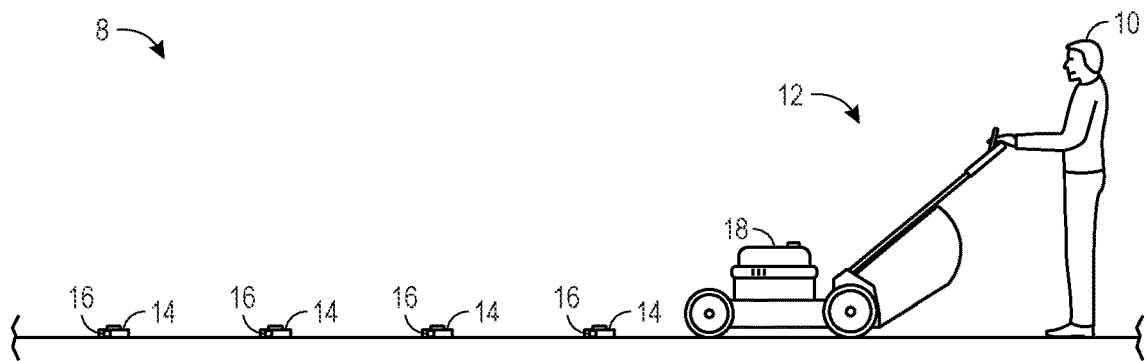
FIG. 1 illustrates a sprinkler head detection system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, at least some existing lawn mowers and lawn mowing methods may fail to account for sprinkler heads that may be present during lawn mowing operations. For example, during mowing of the lawn, a user may unknowingly direct a lawn mower to come into contact with a sprinkler head of a sprinkler system (e.g., may run over the sprinkler head with the lawn mower). This may damage the sprinkler head, which may result in an expensive repair for the sprinkler head. This may also lead to increased water bills and/or water damage, particularly if the damage to the sprinkler head is undetected for some time period. However, it is now recognized that various advantages may be gained by enabling detection of sprinkler heads during lawn mowing.

Accordingly, the present embodiments relate to a sprinkler head detection system that may detect a presence of a sprinkler head as a lawn mower travels over a lawn and/or prior to the lawn mower contacting the sprinkler head. The sprinkler head detection system may utilize a wireless detection method. For example, the sprinkler head may include or be coupled to a radio frequency identification (RFID) tag that may be detected by a radio frequency (RF) reader that is carried with the lawn mower. In response to the RF reader detecting the RFID tag associated with the sprinkler head and/or in response to a processor determining that the RFID tag associated with the sprinkler head is within a threshold distance, the processor may send a control signal to adjust operation of the lawn mower (e.g., power off an engine of the lawn mower, raise a blade of the lawn mower, and/or steer wheels of the lawn mower to avoid the sprinkler head) and/or provide an alert (e.g., audio signal, visual signal, haptic signal) to notify the user who is directing the lawn mower that the lawn mower is approaching the sprinkler head. To facilitate discussion, certain examples provided herein utilize RFID communication methods. However, it should be appreciated that any of a variety of other wireless detection methods and wireless communication methods may be utilized (e.g., Bluetooth, Wi-Fi, Zigbee) with appropriate communication components (e.g., transceivers, transmitters, receivers) instead of the RFID components (e.g., the RFID tags and the RFID readers).

The sprinkler head detection system may also determine that the sprinkler head has been contacted by the lawn mower based on the location of the sprinkler head at different times. For example, the sprinkler head may be detected to be at a first location upon installation of the sprinkler head. However, if the sprinkler head is detected to be at a second location at a later time, a processor of the sprinkler head detection system may determine that the sprinkler head has moved and/or been damaged. Accordingly, the sprinkler head detection system may, upon detection of a change in the location of the sprinkler head, send a request via communication with a user device for the user to confirm that the sprinkler head is damaged. The sprinkler head detection system, upon receipt of confirmation of damage from the user via the user device, may transmit an order for a replacement part to repair and/or replace the sprinkler head. This enables efficient and timely repair of sprinkler heads, and also notifies the user of the damage to the sprinkler heads.

With the foregoing in mind, FIG. 1 is an illustration of an embodiment of a sprinkler head detection system 8. The sprinkler head detection system 8 may alert a user 10 of a lawn mower 12 and that the lawn mower 12 is approaching a sprinkler head 14 and/or may control the lawn mower 12 to block contact between the lawn mower 12 and the sprinkler head 14.

The sprinkler head detection system 8 may include one or more components (e.g., passive components), which may be attached to the one or more sprinkler heads 14 at or after installation at the property and/or included in the one or more sprinkler heads 14 at manufacture, for example. The components may include one or more radio frequency identification (RFID) tags 16. While the RFID tags 16 are shown and described as being coupled to or included within the sprinkler heads 14, it should be appreciated that the RFID tags 16 may be inserted into the lawn beside the one or more sprinkler heads 14 using a small stake or other insertion device so that the location of the sprinkler heads 14 may be detected without placement of any component on the sprinkler heads 14.

Further, the lawn mower 12 may include a detector that is configured to detect the one or more components. For example, the detector may be a radiofrequency (RF) reader that is configured to detect the one or more RFID tags 16 that are associated with the one or more sprinkler heads 14. The detector may be attached to the lawn mower 12 at the property and/or included at manufacture. For example, the RFID tags 16 and the detector may be a kit that may be purchased and installed by the user 10 to enable the disclosed techniques.

The lawn mower 12 may include a mower deck 18 that surrounds cutting blades, and a mower deck actuator may raise and lower the mower deck 18 (and the cutting blades). The lawn mower 12 may include one or more drive components (e.g., engine) that provide power to rotate the cutting blades and/or to drive rotation of the wheels of the lawn mower 12. The lawn mower 12 may include a steering assembly that turns wheels of the lawn mower 12. As the lawn mower 12 travels across the lawn, a processor of the lawn mower 12 may control the mower deck actuator, the one or more drive components, and/or the steering assembly to block contact between the lawn mower 12 and the sprinkler heads 14. For example, the processor may send a control signal to an engine of the lawn mower 12 to automatically power off upon detection of one of the sprinkler heads 14 in front of the lawn mower 12. It should be appreciated that the lawn mower 12 utilized with the sprinkler head detection system 8 may be any type of lawn mower, including an autonomous lawn mower, a riding lawn mower, a self-propelled lawn mower, a push mower, a rotary or reel lawn mower, an electric lawn mower, a petrol lawn mower, or any other suitable lawn mower. Thus, it should also be appreciated that the lawn mower 12 may include any of a variety of controllable components, such as the mower deck actuator, the one or more drive components, and/or the steering assembly, which may be controlled to adjust operation of the lawn mower 12. In some embodiments, the lawn mower 12 may include other types of controllable components, such as one or more output devices (e.g., audio, visual, and/or haptic devices), which may be controlled to provide alerts to the user 10.

In operation, the lawn mower 12 may approach one of the sprinkler heads 14. The RF detector of the lawn mower 12 may trigger the RFID tag 16 associated with the sprinkler head 14 to emit a RFID signal, and the RF reader of the lawn mower 12 may then receive the RFID signal. The processor of the lawn mower 12 may determine, based on the RFID signal that the RFID tag 16 associated with the sprinkler head 14 is within a threshold distance of the lawn mower 12.

In response to determining that the RFID tag 16 associated with the sprinkler head 14 is within the threshold distance of the lawn mower 12, the processor may transmit a control signal to one or more controllable components of the lawn mower 12 to adjust operation of the lawn mower 12 to avoid contact with the sprinkler head 14 and/or to provide an alert to the user 10. The alert may notify the user 10 that the lawn mower 12 is approaching the sprinkler head 14. For example, the lawn mower 12 may include one or more LED's that may be instructed by the processor to output light in response to receipt of the RFID signal at the RF reader. The lawn mower 12 may include a speaker that may be instructed by the processor to output a sound effect in response to receipt of the RFID signal at the RF reader. The lawn mower 12 may include a display screen (e.g., attached to a handle of the lawn mower 12) that may be instructed to project an image that indicates the lawn mower 12 is approaching the sprinkler head 14 in response to receipt of the RFID signal at the RF reader. The image may also be transmitted by the lawn mower 12 to be projected onto a user device, which may include glasses worn by the user, a mobile phone carried by the user, smart contact lenses worn by the user, augmented reality glasses worn by the user, or the like. It should be appreciated that the alert may be provided in response to receipt of the RFID signal at the RF reader and/or upon determining that the RFID tag 16 associated with the sprinkler head 14 is within the threshold distance of the lawn mower 12. In some embodiments, a first type of alert (e.g., light in a first color) may be provided in response to receipt of the RFID signal at the RF reader and a second type of alert (e.g., light in a second color) may be provided in response to determining that the RFID tag 16 associated with the sprinkler head 14 is within the threshold distance of the lawn mower 12. In some embodiments, receipt of the RFID signal at the RF reader may indicate that the RFID tag 16 associated within the sprinkler head 14 is within the threshold distance of the lawn mower 12.

In some embodiments, the lawn mower 12 may be programmed to turn off its engine and shut down operation upon receipt of the RFID signal from the RFID tag 16 associated with the sprinkler head 14 and/or upon determining that the RFID tag 16 associated with the sprinkler head 14 is within the threshold distance of the lawn mower 12. The lawn mower 12 may detect the RFID signal and automatically send a signal to power off the engine (e.g., absent any user input from the user 10, which may be particularly useful for autonomous lawn mowers). The lawn mower 12 may be configured to temporarily raise the mower deck 18 and/or the cutting blades so that the lawn mower 12 does not contact the sprinkler head 14 as the lawn mower 12 passes over the sprinkler head 14. In such cases, the processor of the lawn mower 12 may transmit a command to the mower deck 18 to mechanically raise upon detection of the RFID signal and then may send another command to the mower deck 18 to lower (e.g., back down to a baseline height) when the RFID signal from the RFID tag 16 is no longer detected by the RF reader of the lawn mower 12 and/or when the processor otherwise determines that the lawn mower 12 has cleared the sprinkler head 14.

Figure 2:
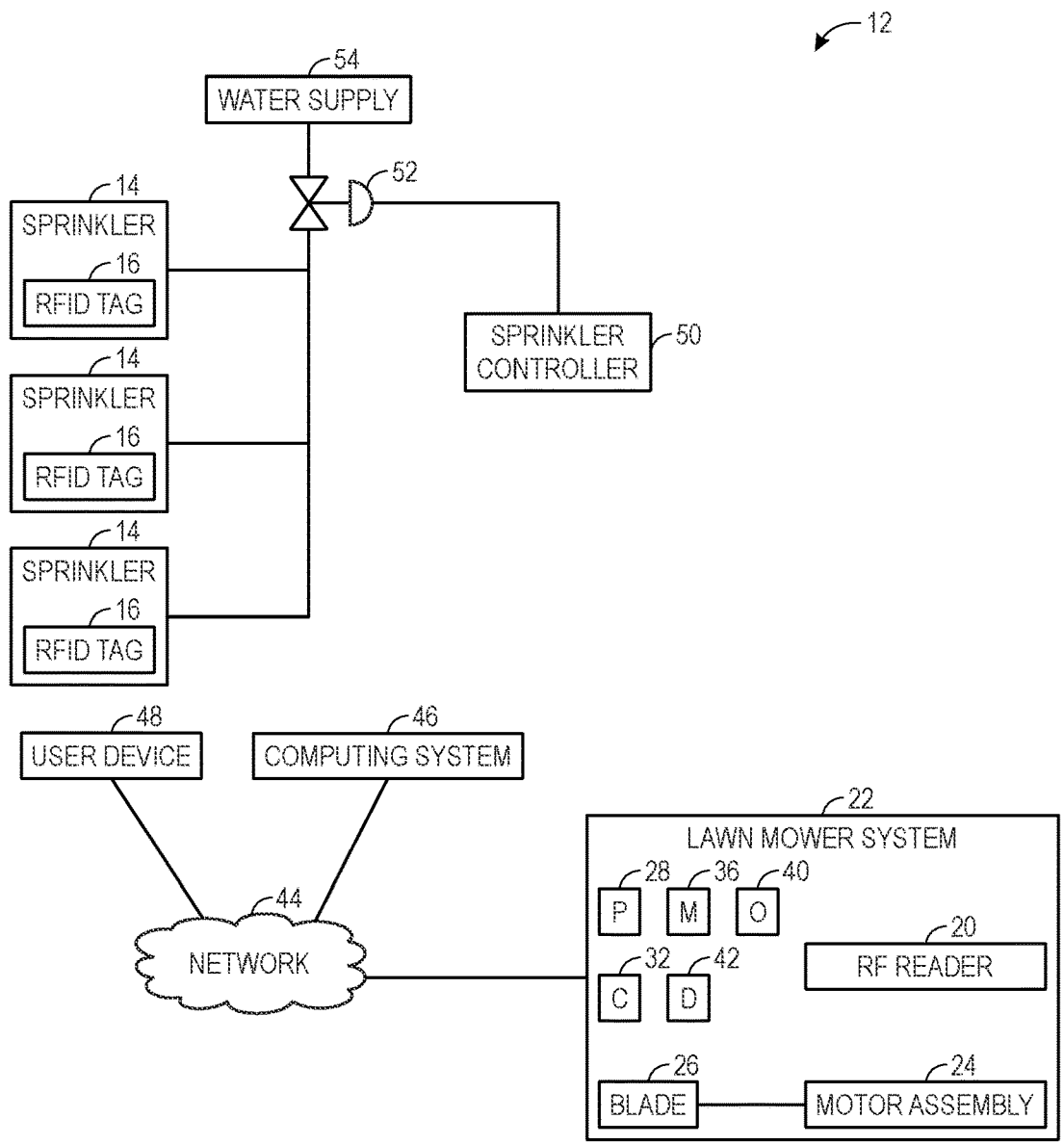
FIG. 2 is a schematic diagram of the sprinkler head detection system of FIG. 1, in accordance with an embodiment of the present disclosure.

FIG. 2 illustrates a schematic diagram of an embodiment of the sprinkler head detection system 8. As shown, an RF reader 20 of the lawn mower 12 may detect an RFID signal that is output by the RFID tag 16 associated with the sprinkler head 14, such as when the lawn mower 12 is approaching the sprinkler head 14. The RFID signal may include an identifier (e.g., unique identifier or code).

A lawn mower system 22 may include the RF reader 20 that may be able to detect the RFID signal when in range of the RFID tag 16 associated with the sprinkler head 14. The RF reader 20 may also include an RF transmitter field component that triggers all RFID tags 16 within a range of the RF reader 20 to emit the RFID signal. The RF reader 20 may be configured to scan in front of the lawn mower 12 (e.g., only in front of the lawn mower 12) to thereby trigger the RFID tags that are within the range of the RF reader 20 and in front of the lawn mower 12 to emit the RFID signal. Furthermore, the RF reader 20 may provide the RFID signal to a processor 28, which may be configured to process the RFID signal to determine whether the RFID tag 16 is within the threshold distance of the lawn mower 12 (e.g., due to being detected by and within a range of the RF reader 20; based on signal strength or other characteristics of the signal; based on RF processing techniques). The RF reader 20 may be attached to the lawn mower 12 at manufacture or may be added at a later date and retrofitted to be attached to any lawn mower 12. It should be appreciated that the RF reader 20 may also be external to the lawn mower 12, such as included in a user device 48 that is carried by the user. Further, multiple RF readers 20 may be attached to the lawn mower 12 to facilitate detection of the RFID tag 16 and/or calculations of the distance between the lawn mower 12 and the RFID tag 16 (e.g., via triangulation techniques).

The lawn mower system 22 may also include one or more controllable components, such as a motor assembly 24 that is coupled to one or more cutting blades 26. As described herein, the motor assembly 24 may be directed by the processor 28 of the lawn mower system 22 to power off or deactivate to stop motion of the cutting blades 26 when the lawn mower 12 is within a threshold distance of the sprinkler head 14. The lawn mower 12 may be able to mechanically raise the mower deck 18 and the one or more cutting blades 26 when the RFID signal is detected by the RF reader 20 (e.g., based on a control signal sent by the processor 28 to a mower deck actuator assembly for the mower deck 18).

A sprinkler system may include a sprinkler controller 50 connected to one or more valves 52 that adjust a flow of water from a water supply 54 to the one or more sprinkler heads 14. Each of the one or more sprinkler heads 14 may include a respective RFID tag 16 that is associated with a unique identifier that includes a unique identification number corresponding to the specific RFID tag 16. Therefore, each respective sprinkler head 14 of the sprinkler system may correspond to a unique identification number that can be transmitted via the RFID signal.

The lawn mower system 22 may include various types of components that may assist the lawn mower system 22 in performing various types of tasks and operations described herein. For example, the lawn mower system 22 may include a communication component 32, the processor 28, a memory 36, input/output (I/O) ports 40, a display 42 (and/or other output device, such as one or more LEDs, speakers, and/or haptic devices), and the like. The communication component 32 may be a wireless or wired communication component that may facilitate communication between the lawn mower system 22, data sources, and various other computing systems via a network 44, the Internet, or the like. The processor 28 may be any type of computer processor or microprocessor capable of executing computer-executable code. The processor 28 may also include multiple processors that may perform the operations described below. Further, the lawn mower system 22 may include a distributed system including the multiple processors (e.g., cloud processors, remote servers, and/or on the lawn mower 12) that cooperate to perform the operations described below.

The memory 36 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. As used herein, applications may include any suitable computer software or program that may be installed onto the lawn mower system 22 and executed by the processor 28. The memory 36 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components, such as input devices (e.g., keyboard, mouse), sensors, input/output (I/O) modules, and the like. The display 42 may operate as a human machine interface (HMI) to depict visualizations associated with software or executable code being processed by the processor 28. In one embodiment, the display 42 may be a touch display capable of receiving inputs from a user of the lawn mower system 22. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the lawn mower system 22. It should be noted that the components described above with regard to the lawn mower system 22 are examples and the lawn mower system 22 may include additional or fewer components relative to the illustrated embodiment. For example, the lawn mower system 22 may include other output devices, such as a speaker to emit sounds (e.g., audible alerts to the user) and/or a haptic device to emit haptics (e.g., haptic alerts, such as vibrations, to the user).

In certain embodiments, the lawn mower system may be communicatively coupled to the network 44, which may include collections of computing systems 46, the Internet, an Intranet system, or the like. The network may facilitate communication between the computing system 46 and various other data sources. For instance, the network may be communicatively coupled to the user device 48 (e.g., user mobile device), the sprinkler controller 50, and/or a computing system 46 (e.g., third party system). In some embodiments, the network 44 may be communicatively coupled to one or more databases, which may store data regarding sprinkler head repair and replacement data. In addition, the one or more databases may include an exposed application programming interface (API) that provides data services regarding lawn conditions. The one or more databases may conduct ongoing updates to add additional sprinkler head condition data to the one or more databases based on multiple individuals completing repairs. The tracking of repairs and sprinkler head condition is further elaborated on by FIG. 3.

Figure 3:
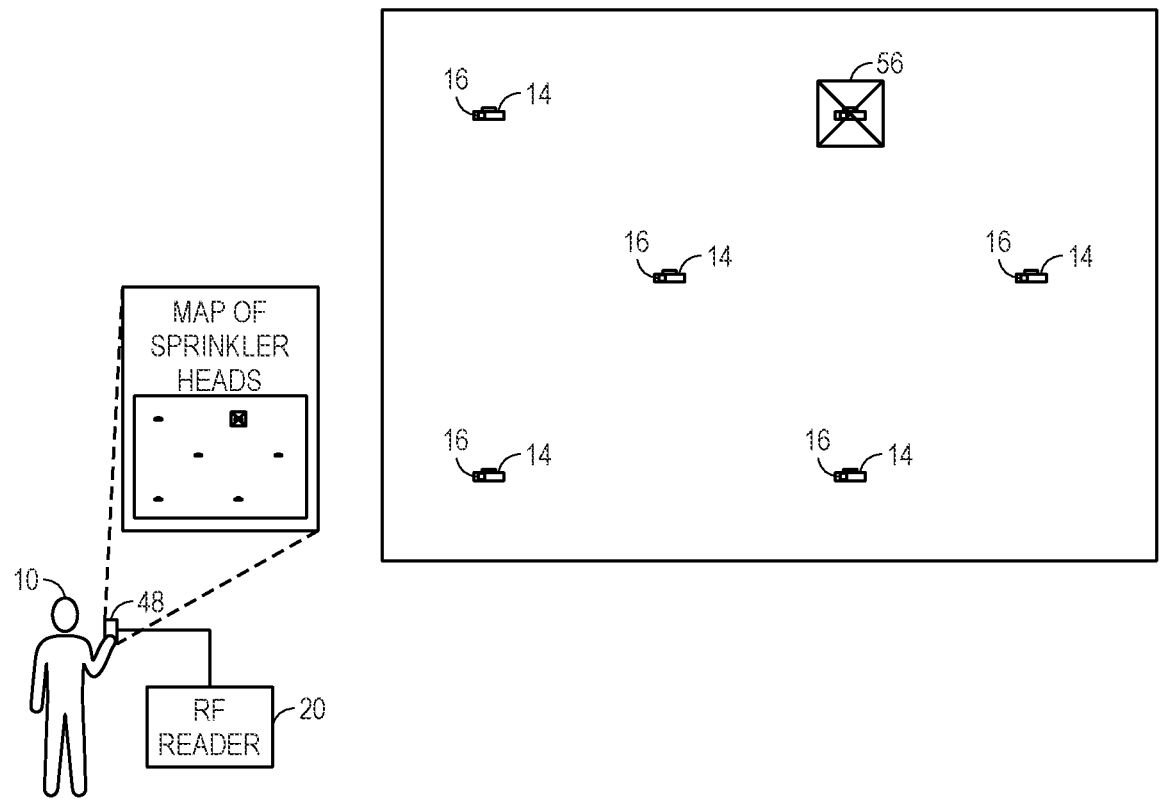
FIG. 3 illustrates a user's interaction with the sprinkler detection system of FIG. 1, in accordance with an embodiment of the present disclosure.

With reference to FIG. 3, the user device 48 may receive information regarding the location of the one or more sprinkler heads 14 and possible damage to the one or more sprinkler heads 14 of the sprinkler system. As mentioned above, a display screen of the user device 48 associated with the user 10 may display a map of the one or more sprinkler heads 14. The user device 48 may include the RF reader 20 that may detect the RFID signals from the one or more RFID tags 16 associated with the one or more sprinkler heads 14 at the property. Alternatively, the RF reader 20 may be external to the user device 48 (e.g., a separate portable device) and may be communicatively coupled to the user device 48 to communicate the RFID signals and/or the location of the one or more sprinkler heads 14 to the user device 48. The user 10 may carry the RF reader 20 as the user walks through the area (e.g., lawn) having the one or more sprinkler heads 14. The RF reader 20 may detect the RFID signals, which each include an identification number associated with each sprinkler head 14. The RF reader 20 may transmit the RFID signals and identification numbers to a processor of a computing device or system, such as the computing system 46 of FIG. 2. The user device 48 may utilize a GPS component of the user device 48 to associate GPS coordinates with the location for each sprinkler head 14. In any case, the location (e.g., relative location and/or GPS coordinates) and the identification number for each sprinkler head 14 may be stored, such as in one or more databases. The user device 48 may repeat this process as the user 10 walks throughout the property and may store the location and the identification number for each sprinkler head 14 in the sprinkler system.

The computing system, such as the computing system 46, may utilize the location and the identification information for each sprinkler head 14 at the property to generate and to instruct display of a map that illustrates the location of each sprinkler head 14 at the property (e.g., via the display screen of the user device 48). The map may be updated periodically based on detection of a change in location of any of the sprinkler heads 14, which may indicate that the sprinkler head 14 was contacted by the lawn mower 12 and/or that the sprinkler head 14 may need repair. For example, the user 10 may be on the property with the user device 48 and the RF reader 20, and the RF reader 20 may obtain the RFID signals from the RFID tags 16 for the sprinkler heads 14 at the property. The computing system may receive the identification information encoded within the RFID signals and determine the location for each RFID tag 16 based on the RFID signals. The computing system may update the location for each sprinkler head 14, compare a prior location (e.g., initial location) to a current location to determine whether there has been a change in the location of the sprinkler head 14 corresponding to a unique identification number. In response, the user device 48 may transmit an alert to the user 10 to notify the user 10 that the position of the sprinkler head 14 has changed and/or may display the change in the position on the display screen of the user device 48. The user device 48 may indicate the original location of the sprinkler head 14 on the display screen and may indicate with a red mark, an X, or other visual indicator that the sprinkler head 14 is no longer at the original location and may indicate in another color the updated location of the sprinkler head 14 on the display screen. It should be appreciated that the map, including the map that illustrates the change in the position of the sprinkler head 14, may be displayed via the display 42 of the lawn mower 12. Furthermore, the map, including the map that illustrates the change in the position of the sprinkler head 14, may be generated based on the RFID signals received by the RF reader 20 carried by the lawn mower 12.

The notification may also alert the user 10 of potential repair needed for the sprinkler head 14. For example, during the mowing of the lawn at the property or other lawn maintenance activity, the sprinkler head 14 may have been contacted by lawn maintenance equipment and the sprinkler head 14 may be damaged as a result of the contact. The ability to detect potential damage to the sprinkler head 14 may facilitate user 10 awareness of the potential damage and alert the user 10 that repair to the sprinkler head 14 may be needed.

Figure 4:
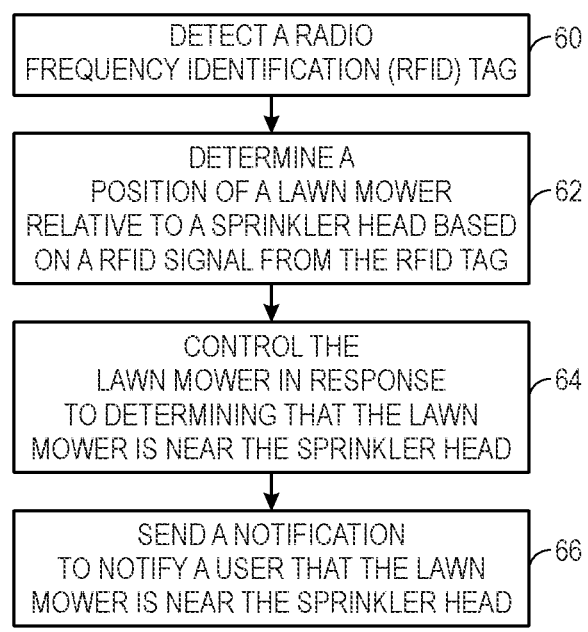
FIG. 4 is a flow diagram of a method of operating the sprinkler head detection system of FIG. 1, in accordance with an embodiment of the present disclosure.

With the forgoing in mind, FIG. 4 illustrates a flow diagram of an embodiment of a method of sprinkler head detection. The following description of the method is described as being performed by a processing system (e.g., the lawn mower system 22 with the processor 28), but it should be noted that any suitable processor-based device or system may be specially programmed to perform any of the methods described herein. Moreover, although the following description of the method is described as including certain steps performed in a particular order, it should be understood that the steps of the method may be performed in any suitable order, that certain steps may be omitted, and/or that certain steps may be added. Generally, the lawn mower system 22 may detect the RFID tag 16 associated with the sprinkler head 14, and in response, send a notification to the user 10 (e.g., who is controlling and/or observing operation of the lawn mower 12) that the lawn mower 12 is near the sprinkler head 14.

At block 60, as the lawn mower 12 travels across the lawn, the RF reader 20 may detect a RFID signal that is transmitted by the RFID tag 16 associated with the sprinkler head 14 (e.g., in front of the lawn mower 12). The RF reader 20 may transmit the RFID signal to the processor 28. At block 62, the processor 28 may determine a position of the lawn mower 12 relative to the RFID tag 16 (and thus, the sprinkler head 14 associated with the RFID tag 16). For example, the processor 28 may determine that the lawn mower 12 is within a threshold distance of the RFID tag 16 (and thus, the sprinkler head 14) upon receipt of the RFID signal at the RFID tag 16. The processor 28 may determine the position of the lawn mower 12 relative to the RFID tag 16 and determine that the lawn mower 12 is within the threshold distance in response to receipt of the RFID signal at the RF reader 20 (e.g., due to the RFID tag 16 being within the range of the RF reader 20). In some embodiments, the processor 28 may determine the position of the lawn mower 12 relative to the RFID tag 16, such as based on analysis of a strength of the RFID signal, to thereby determine that the lawn mower 12 is within the threshold distance. Thus, determining the position of the lawn mower 12 relative to the RFID tag 16 (e.g., the distance between the lawn mower 12 and the RFID tag 16) may be accomplished in any of a variety of suitable manners.

At block 64, the processor 28 may control one or more controllable components of the lawn mower 12 in response to determining that the lawn mower 12 is near the sprinkler head 14 (e.g., within the threshold distance, which may include being within the range of the RF reader 20 and/or forward of the lawn mower 12). For example, the processor 28 may transmit a command to the mower deck 18 to raise the mower deck 18 in response to determining that the lawn mower 12 is near the sprinkler head 14 (e.g., raised from a cutting height to a non-cutting height; raised from a first height, lower cutting height to a second, higher cutting height). The processor 28 may transmit the command to raise the mower deck 18 for a period of time (e.g., 5 seconds or 10 seconds) and then automatically return the mower deck 18 to its original height (e.g., to the cutting height; to the first height, lower cutting height). In some embodiments, the processor 28 may determine when the RFID signal corresponding to the sprinkler head 14 is no longer detected and transmit an additional command to the mower deck 18 to lower the mower deck 18 (e.g., to its original height). Additionally, the processor 28 may transmit a command to the engine to power off the lawn mower 12 and/or a command to the steering assembly to steer the lawn mower 12. In the cases of an autonomous or self-driving mower, the processor 28 may be able to reconfigure a mowing path (e.g., generate a new mowing path) around the sprinkler head 14 in response to the RFID signal and/or using the map of the sprinkler heads 14 in the lawn. Indeed, the processor 28 may be able to reconfigure and/or make adjustments to the mowing path in real time as the lawn mower 12 travels through the lawn (e.g., in response to detection of the sprinkler heads 14).

At block 66, the processor 28 may transmit a notification, such as to the display 42 and/or to the user device 48. The processor 28 may transmit the notification in response to the lawn mower 12 approaching the sprinkler head 14. The notification may be configured to display a map, text instructions, and/or other indicators (e.g., highlight an area of the lawn that should be avoided). The user 10 may then manually direct the lawn mower 12 away from the sprinkler head 14 based on the notification. Additional or alternative notification may be provided, such as to notify the user 10 that the sprinkler head 14 is within the threshold distance of the lawn mower 12.

Figure 5:
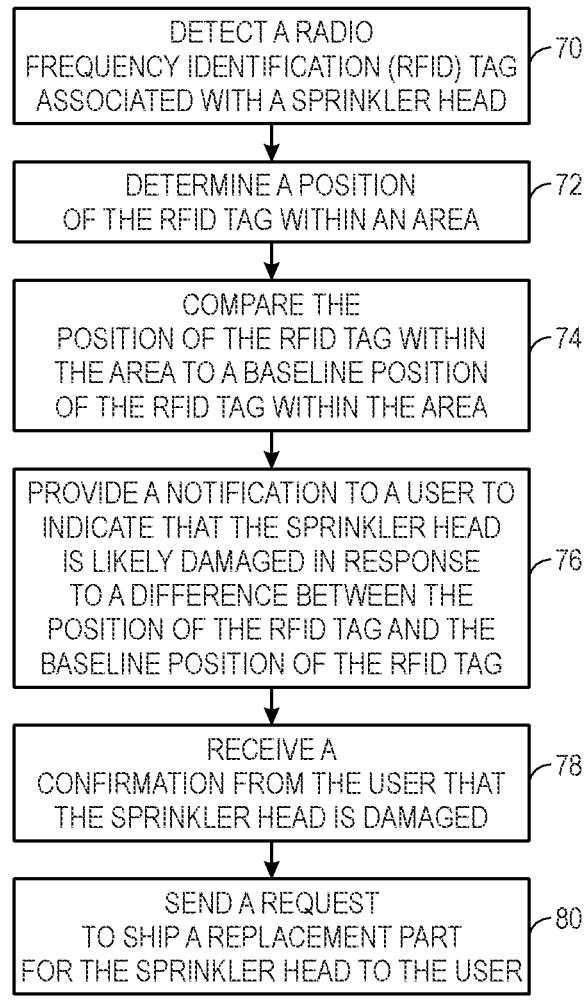
FIG. 5 is a flow diagram of a method of operating a sprinkler head replacement system, in accordance with an embodiment of the present disclosure.

With the forgoing in mind, FIG. 5 is a flow diagram of an embodiment of a method of sprinkler head detection and repair. The following description of the method is described as being performed by a processing system (e.g., the computing system 46), but it should be noted that any suitable processor-based device or system may be specially programmed to perform any of the methods described herein. Moreover, although the following description of the method is described as including certain steps performed in a particular order, it should be understood that the steps of the method may be performed in any suitable order, that certain steps may be omitted, and/or that certain steps may be added. As discussed herein, the lawn mower 12 may contact one of the sprinkler heads 14. Accordingly, it may be advantageous to send a notification of potential damage and a suggestion for repair and/or replacement of the sprinkler head 14 to aid in facilitating timely repair of the sprinkler head 14.

At block 70, the RF reader 20 (e.g., in the lawn mower 12, the user device 48, or in a separate device) may detect the RFID signal. At block 72, a processor of a computing system, such as the computing system 46, may determine a position of the RFID tag 16 (and thus, the sprinkler head 14 associated with the RFID tag 16) within an area (e.g., a lawn). The processor may access data from a GPS component and/or process the RFID signal (e.g., strength of the RFID signal correlates to distance) to determine the position of the RFID tag 16 within the area. The position of the RFID tag 16, along with an identification number of the RFID tag 16 associated with the RFID signal, may be stored in one or more databases. At block 74, the processor may access past positions stored in the one or more databases corresponding to the identification number and may determine if the sprinkler head 14 has changed positions (e.g., the positions do not match or do not correspond to one another) since a last recorded position (or a baseline position) in the one or more databases.

At block 76, in response to the processor determining that the sprinkler head 14 is located in a new location different than the last recorded location(s), the processor may transmit a notification (e.g., to the user device 48) indicating potential damage to the sprinkler head 14 based on the change in the location of the sprinkler head 14. The notification may prompt the user 10 to check the sprinkler head 14 and/or to provide a user input to confirm the damage to the sprinkler head 14. In such cases, the user 10 may then provide the user input to confirm the damage to the sprinkler head 14 based on user observation. At block 78, the processor may determine that the sprinkler head 14 is damaged based on the user input. At block 80, the processor may query one or more databases that include replacement and repair products corresponding to the sprinkler head 14 (e.g., stored at installation of the sprinkler head 14 and associated with the unique identification number in the one or more databases) to determine the replacement sprinkler head. The processor may then transmit a request (e.g., to a supplier computing system) to ship the replacement sprinkler head to the user 10 at the property. As noted above, the automated repair and replacement techniques may be carried out based on data collected by the RF reader 20 during mowing with the lawn mower 12 and/or during a separate process (e.g., separate from mowing with the lawn mower 12) in which the user 10 travels across the lawn with the RF reader 20. As noted herein, certain blocks of the method may be omitted. For example, block 76 and/or 78 may be omitted, and the processor may send the request to ship the replacement part in response to determining that the sprinkler head 14 is located in the new location (and is therefore likely damaged). Further, it should be appreciated that the processor may take other actions in response to determining that the sprinkler head 14 is located in the new location (and is therefore likely damaged), and the other actions may include providing a command signal to a valve to block a water flow to the sprinkler head(s) 14.

It should be appreciated that an insurance provider may have access to the map of the sprinkler heads 14 and/or may operate the computing system 46, which may enable the insurance provider to monitor a status of the sprinkler heads 14 at the property. In some cases, the insurance provider may provide a discounted rate (e.g., premium) for the property that has the lawn mower system 22 that operates to block or to avoid contact between the lawn mower 12 and the sprinkler heads 14 and/or that maintains the map of the sprinkler heads 14. The insurance provider may also provide the discounted rate for the property that has signed up for automatic delivery of replacement parts and/or that completes the repairs of the sprinkler heads 14 within a certain time period (e.g., the sprinkler heads 14 are maintained in working condition to avoid water damage to surrounding structures).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure. It should be appreciated that features discussed with references to different examples provided herein may be combined.

The invention claimed is:

1. A system, comprising:
one or more processors; and
memory storing instructions executable by the one or more processors to cause the one or more processors to:
receive a radio frequency identification (RFID) tag signal emitted by a RFID tag associated with a sprinkler head;
determine a distance between a lawn mower and the sprinkler head based on the RFID tag signal;
control the lawn mower in response to the distance between the lawn mower and the sprinkler head being within a threshold distance; and
discount an insurance rate for a property associated with the sprinkler head in response to authorization to control the lawn mower in response to the distance between the lawn mower and the sprinkler head being within the threshold distance.

2. The system of claim 1, wherein the lawn mower comprises an autonomous lawn mower, a riding lawn mower, a self-propelled lawn mower, a rotary or reel lawn mower, an electric lawn mower, a petrol lawn mower, or any combination thereof.

3. The system of claim 1, wherein the instructions are executable by the one or more processors to cause the one or more processors to send a command to power off an engine of the lawn mower to control the lawn mower in response to the distance between the lawn mower and the sprinkler head being within the threshold distance.

4. The system of claim 1, wherein the instructions are executable by the one or more processors to cause the one or more processors to:
generate a map of a property that includes an indication of a location of the sprinkler head based on the RFID tag signal; and
display the map on a display screen of a user device.

5. The system of claim 1, wherein the lawn mower comprises a RFID reader device that is configured to detect the RFID tag signal emitted by the RFID tag and to provide the RFID tag signal to the one or more processors.

6. A system, comprising:
one or more processors; and
memory storing instructions executable by the one or more processors to cause the one or more processors to:
receive a wireless signal output by a communication component of a sprinkler head at a first time;
determine a distance between a lawn mower and the sprinkler head based on the wireless signal;
control the lawn mower in response to the distance between the lawn mower and the sprinkler head being within a threshold distance;
receive an additional wireless signal output by the communication component of the sprinkler head at a second time;
determine a first position of the sprinkler head in the lawn at the first time based on the wireless signal output;
determine a second position of the sprinkler head in the lawn at the second time based on the additional wireless signal output; and
output an alert via a user device in response to a difference between the first position of the sprinkler head in the lawn at the first time and the second position of the sprinkler head in the lawn at the second time.

7. The system of claim 6, wherein the instructions are executable by the one or more processors to cause the one or more processors to send a command to a mower deck of the lawn mower to raise the mower deck to control the lawn mower in response to determining that the lawn mower and the sprinkler head are within the threshold distance.

8. The system of claim 6, wherein the instructions are executable by the one or more processors to cause the one or more processors to send a command to power off an engine of the lawn mower to control the lawn mower in response to the distance between the lawn mower and the sprinkler head being within the threshold distance.

9. The system of claim 6, wherein the instructions are executable by the one or more processors to cause the one or more processors to generate a map of a property that includes an indication of the first position of the sprinkler head in the lawn at the first time based on the wireless signal.

10. The system of claim 9, wherein the instructions are executable by the one or more processors to cause the one or more processors to transmit the map to a user device for display on a display screen of the user device.

11. The system of claim 10, wherein the user device comprises glasses worn by a user, a mobile phone carried by the user, smart contact lenses worn by the user, augmented reality glasses worn by the user, or any combination thereof.

12. The system of claim 6, wherein the communication component comprises a radio frequency identification (RFID) tag.

13. The system of claim 6, wherein the instructions are executable by the one or more processors to cause the one or more processors to send a command to cause one or more light emitting diodes of the lawn mower to emit light to control the lawn mower in response to the distance between the lawn mower and the sprinkler head being within the threshold distance.

14. A method comprising:
   detecting, via communication circuitry, a wireless signal output by a communication component of a sprinkler head;
   determining, via one or more processors, a position of the communication component within an area based on the wireless signal;
   accessing, via the one or more processors, a baseline position of the communication component within the area;
   comparing, via the one or more processors, the position of the communication component of the sprinkler head within the area to the baseline position of the communication component within the area;
   determining, via the one or more processors, that the position of the communication component of the sprinkler head within the area is different than the baseline position of the communication component within the area; and
   sending, via the communication circuitry, a notification to an electronic device associated with a user of the sprinkler head in response to determining that the position of the communication component of the sprinkler head within the area is different than the baseline position of the communication component within the area.

15. The method of claim 14, wherein the notification comprises an indication that the sprinkler head is damaged based on a difference between the position of the communication component of the sprinkler head within the area and the baseline position of the communication component within the area.

16. The method of claim 14, wherein the method comprises sending, via the communication circuitry, an additional notification that comprises a request to the user to confirm that the sprinkler head is damaged.

17. The method of claim 16, wherein the method comprises sending, in response to receiving user confirmation that the sprinkler head is damaged and via the communication circuitry, an instruction to ship a replacement part for the sprinkler head to a location associated with the user.

18. The method of claim 14, wherein the communication component comprises a radio frequency identification (RFID) tag.

19. The system of claim 6, wherein the instructions are executable by the one or more processors to cause the one or more processors to discount an insurance rate for a property associated with the sprinkler head in response to authorization to control the lawn mower in response to the distance between the lawn mower and the sprinkler head being within the threshold distance.

20. The method of claim 14, comprising:
   generating, via the one or more processors, a map of a property that includes an indication of the baseline position, the position, or both; and
   transmitting, via the one or more processors, the map to the electronic device for display on a display screen of the electronic device.

* * * * *